United States Patent [19]

Robertson et al.

[11] 3,947,525

[45] Mar. 30, 1976

[54] MELT-PROCESSABLE, RADIATION CROSS-LINKABLE E-CTFE COPOLYMER COMPOSITIONS

[75] Inventors: Arthur B. Robertson, Succasunna; Robert J. Schaffhauser, Brookside, both of N.J.

[73] Assignee: Allied Chemical Corporation, New York, N.Y.

[22] Filed: Jan. 30, 1973

[21] Appl. No.: 327,907

[52] U.S. Cl. ..... 204/159.17; 260/92.1 S; 260/878 R
[51] Int. Cl.² ... C08L 23/00; C08F 214/24; C08F 259/08
[58] Field of Search .................. 260/878 R, 92.1 S; 204/159.17

[56] References Cited
UNITED STATES PATENTS

| | | | |
|---|---|---|---|
| 2,820,776 | 1/1958 | Robb et al. ..................... | 260/92.1 S |
| 3,745,145 | 7/1973 | Khattab et al. .............. | 260/45.85 R |
| 3,763,222 | 10/1973 | Aronoff et al. ................. | 260/92.1 S |
| 3,773,698 | 11/1973 | Khattab ....................... | 260/45.75 R |

*Primary Examiner*—Joseph L. Schofer
*Assistant Examiner*—A. Holler
*Attorney, Agent, or Firm*—Roger H. Criss; Michael S. Jarosz

[57] ABSTRACT

Melt-processable, radiation cross-linkable ethylene/chlorotrifluoroethylene copolymer compositions are provided which contain about 0.1 to 5% by weight of the copolymer of a radiation cross-linking promoter, about 0.01 to 5% by weight of an anti-oxidant and about 0.1 to 30% by weight of an acid scavenger. Such compositions do not give off odors when irradiated to cross-link the copolymer and do not develop bubbles after irradiation.

15 Claims, No Drawings

MELT-PROCESSABLE, RADIATION CROSS-LINKABLE E-CTFE COPOLYMER COMPOSITIONS

BACKGROUND OF THE INVENTION

1. Field of the Invention

This invention relates to melt-processable, radiation cross-linkable ethylene/chlorotrifluoroethylene copolymer compositions.

2. Description of the Prior Art

It has been proposed to irradiate ethylene/chlorotrifluoroethylene copolymers to improve their tensile strength at high temperatures as well as other properties. The proposed ionizing radiation includes X-rays, gamma rays, electron beams, etc. It has also been proposed to heat the copolymers subsequent to irradiation to improve mechanical properties and to incorporate a small amount of a cross-linking promoter such as triallylcyanurate into the copolymer prior to irradiation to reduce the radiation dosage.

It has been found that ethylene/chlorotrifluoroethylene copolymer compositions including triallylcyanurate or its position isomer, triallylisocyanurate, are not melt processable, such as by extrusion or injection molding, due to the high temperatures required for such melt processing operations and the extrudates have a discolored and bubbled appearance. Melt processing temperatures above about 250°C. are required to fabricate articles such as valves, gaskets, papers, wire insulation, sheets and films and at such temperatures, the copolymer compositions rapidly increase in viscosity and eventually "set up" when extruded or molded. It has further been found that such compositions emit an odor when irradiated and develop bubbles after irradiation.

SUMMARY OF THE INVENTION

In accordance with this invention, melt-processable, radiation cross-linkable ethylene/chlorotrifluoroethylene copolymer compositions are provided which contain about 0.1 to 5% by weight of the copolymer of a radiation cross-linking promoter, about 0.01 to 5% by weight of an anti-oxidant and about 0.1 to 30% by weight of an acid scavenger. Such compositions do not give off odors when irradiated to cross-link the copolymer and do not develop bubbles after irradiation.

DESCRIPTION OF THE PREFERRED EMBODIMENT

In accordance with a preferred embodiment of the present invention, melt-processable, radiation cross-linkable ethylene/chlorotrifluoroethylene copolymer compositions are provided which comprise the copolymer and the following additives intimately dispersed therein, all based upon the weight of the copolymer: (a) about 0.1 to 5%, preferably about 0.75 to 1.5%, of a radiation cross-linking promoter; about 0.01 to 5%, preferably about 0.1 to 0.5%, of an anti-oxidant; and about 0.1 to 30%, preferably about 0.25 to 10%, of an acid scavenger. The compositions of this invention can be successfully melt processed in a variety of operations, without "setting up" in the extruder or mold, including wire and cable extrusion, sheet and film extrusion and tubing extrusion. The extrudates are bubble-free and discoloration free. The compositions can be cross-linked at relatively low radiation levels without emitting an odor or forming bubbles in the extrudate.

It is believed that the anti-oxidant renders the composition melt-processable by preventing rapid increases in viscosity, and it is thought that the acid scavenger neutralizes acidic gases whih are liberated during irradiation and which cause odor emission and bubble formation. Compositions of the copolymer which do not contain the acid scavengers give off irritating odorous gases during irradiation and develop numerous small surface bubbles a few days after irradiation. In distinction thereto, the compositions of this invention which contain the acid scavengers do not give off pungent odors during irradiation and do not exhibit surface bubbling following irradiation. The radiation cross-linking promoters are employed to reduce the amount of radiation necessary to cross-link the copolymer.

The ethylene/chlorotrifluoroethylene copolymers which may be stabilized in accordance with the present invention are high molecular weight, normally solid, thermoplastic polymers containing between about 40 and about 60 mol % of ethylene units and correspondingly between about 60 and 40 mol % of chlorotrifluoroethylene units in the molecule and having melting points above about 200°C. The stabilizing compositions in accordance with the present invention are particularly advantageous for use in about equimolar ethylene/chlorotrifluoroethylene copolymers containing between about 45 and about 55 mol % of ethylene units and having melting points above about 220°C., preferably between about 200° and 265°C.

These copolymers may be described by processes well known to those skilled in the art, as described, for example, in Hanford U.S. Pat. No. 2,392,378, which shows copolymerization of ethylene with chlorotrifluoroethylene in a stirred aqueous medium at superatmospheric pressure using benzoyl peroxide as catalyst; in *Nucleonics*, September, 1964, pp. 72–74, disclosing formation of a high melting (237°C.) 1:1 alternant copolymer of ethylene and chlorotrifluoroethylene prepared using a radiation catalyst at 0°C.; in British Pat. No. 949,422, showing bulk copolymerization of ethylene with chlorotrifluoroethylene at temperatures between −80° to +50°C. using oxygen-activated alkyl boron catalysts; in Ragazzini et al. U.S. Pat. Nos. 3,371,076 and 3,501,446, relating to methods for making ethylene/chlorotrifluoroethylene copolymers using oxygen-activated boron-containing catalysts and to products obtained by that process. About equimolar ethylene/chlorotrifluoroethylene copolymers having high melting point above 200°C. can also be prepared by batchwise bulk copolymerization of the monomers at temperatures of about 0°C., say between about −20° to +20° C., at superatmospheric pressure in an agitator-equipped pressure vessel by charging the vessel with liquid chlorotrifluoroethylene monomer and bubbling gaseous ethylene into this monomer, using organic peroxide-type initiators, such as trichloroacetyl peroxide and, if desired, adding small amounts of chain transfer agents, such as chloroform or heptane. The desired copolymer product is obtained as a dispersion in the monomer.

As cross-linking promoters there can be employed in this invention triallylisocyanurate, triallylcyanurate, triallylphosphite, diallylfumarate, diallylisophthalate, diallylterephthalate, and the like. A preferred cross-linking promoter is triallylisocyanurate. These cross-linking promoters reduce the radiation dosage required to bring about cross-linking of the copolymer.

The radiation utilized to cross-link the copolymer is of sufficiently high energy to penetrate the thickness of the copolymer being treated and produce ionization therein. The ionizing radiation may consist of X-rays, gamma rays, or a beam of electrons, protons, deuterons, alpha-particles, beta-particles, or the like, or combinations thereof. As such types of radiation and their sources are well known, they are not specifically described herein. Preferred ionizing radiation sources include cobalt-60 which emits highly penetrating gamma radiation and high energy electron beams.

The amount of radiation to which the copolymer is subjected to improve its mechanical and other properties is generally in the range of about 2 to 50 megarads or higher, preferably 5 to 15 megarads. The presence of the cross-linking promoter significantly reduces the radiation dosage required to bring about cross-linking. For instance, in order to render ethylene/chlorotrifluoroethylene resistant to thermal stress cracking at 200°C., the presence of 1% of triallylisocyanurate requires an exposure to 5 megarads of electron beam radiation, whereas without the promoter present, 40 megarads of the same radiation is required to render the copolymer resistant to stress cracking.

Anti-oxidants which are employed in this invention can be a mixture of a phosphite or an organic polyhydric phenol and a salt of a carboxylic acid and a metal of Group II of the Periodic Table; an alkylated phenol or bisphenol having 1 to 18 carbon atoms in the alkyl chain such as butylated hydroxytoluene 4,6-di-tert.-butylmetacresol and the like, and an alkylidene bis, tris or other polyphenol having 1 to 8 carbon atoms in the alkylidene chain such as tetrakis-[methylene-3-(3',5'-di-tert.-butyl-4'-hydroxyphenyl)propionate]methane, 2,2-methylene-bis-(4-ethyl-6-tert.-butyphenol) and the like. Preferably, the anti-oxidant is admixed with an ester or alkali metal salt of thiodipropionic acid.

Preferred anti-oxidants of this invention include a three component mixture of a phosphite or an organic polyhydric phenol, a salt of a carboxylic acid and a metal of Group II of the Periodic Table and an ester or alkali metal salt of thiodipropionic acid, and a mixture of about 0.005 to 5% by weight of the copolymer of tetrakis-[methylene 3-(3',5'-di-t-butyl-4'-hydroxyphenyl)propionate]methane and about 0.005 to 1.0% by weight of the copolymer of an ester or alkali metal salt of thiodipropionic acid. A particularly preferred anti-oxidant is a three-component mixture comprising: (a) about 0.01 to 5% by weight of the copolymer of a transesterified reaction product of an organic polyhydric phenol having from 6 to about 50 carbon atoms and an organic phosphite triester free from phenolic hydroxyl groups having up to about 60 carbon atoms obtained by transesterification of the phenol and phosphite; (b) about 0.01 to 5% by weight of a copolymer of a salt of a monocarboxylic acid having from about 6 to about 24 carbon atoms and a metal of Group II of the Periodic Table; and (c) about 0.01 to 5% by weight of the copolymer of an ester or alkali metal salt of thiodipropionic acid. Such mixture is disclosed, for example, in copending U.S. application of Khattab et al., Ser. No. 124,913, filed Mar. 16, 1971, now U.S. Pat. No. 3,745,145 which disclosure is specifically incorporated herein.

As disclosed in said application, the organic polyhydric phenols used to obtain the transesterified reaction product used in the copolymer composition of the present invention are selected from the group consisting of 1,1,3-tris(2-methyl-4-hydroxyl-5-tert.-butyl phenyl)butane and a phenol having the formula

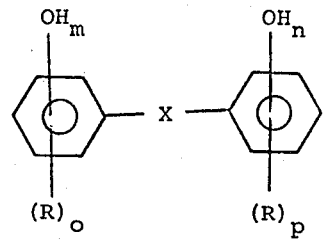

wherein X is selected from the group consisting of oxygen, sulfur, alkylene, alicyclidene, arylidene and mixed alkylenearylidene and alkylene-alicyclidene groups, wherein the aliphatic or cycloaliphatic portion of the molecule may be straight chain or branched chain, having from 1 to about 18 carbon atoms, wherein the R substituents, which may be the same or different, are independently selected from the group consisting of hydrogen and alkyl, straight or branched chain, having from 1 to about 18 carbon atoms; and wherein $m$ and $n$ are integers from 1 to 5, and $o$ and $p$ are integers from 0 to 4, with the proviso that the sums of $m + o$, and $n + p$ may not exceed 5. The OH groups preferably are in ortho and/or para position to X.

Transesterified reaction products or organic polyhydric phenols and organic phosphite triesters suitable for use in the presently claimed invention are described for example, in U.S. Pat. Nos. 3,244,650 and 3,255,136, both issued to Hecker et al.

Especially preferred polyhydric phenols are 4,4-n-butylidene-bis-(6-tert.-butyl-m-cresol) and 1,1,3-tris(2-methyl-4-hydroxy-5-tert.-butylphenyl)butane.

Organic phosphites suitable for making the transesterified reaction products of organic polyhydric phenol and organic phosphite triester useful in the anti-oxidant compositions of the present invention are also described in U.S. Pat. No. 3,244,650. They can be any organic phosphite having the formula (Ra)$_3$P wherein a is selected from the group consisting of oxygen, sulfur and mixtures thereof, and R is selected from the group consisting of aryl, alkyl, cycloalkyl, aralkyl, alkaryl and combinations thereof. The term "organic phosphite triester," as used herein, includes oxo, thio and mixed oxo-thio phosphites. For reasons of availability, the phosphite will not usually have more than 60 carbon atoms.

The transesterified reaction products of organic polyhydric phenols and organic phosphite triesters free from phenolic hydroxyl groups may be obtained by heating together the phenol and phosphite ester, preferably at temperatures of from 100° to 200°C., if necessary under reflux. To expedite transesterification it is preferred to add a small amount of an alkali or alkaline earth metal oxide, hydroxide or phenolate, in amount of between about 0.05 to about 1% by weight. Although it is not necessary that transesterification be complete, it is believed that only the transesterification product is suitable for use in stabilizing about equimolar ethylene/chlorotrifluoroethylene copolymers during melt processing in accordance with the present invention because only they have sufficiently high boiling points to ensure their presence during fabrication by melt processing at temperatures of up to about 320°C. Usually, transesterification involving about one-third of the phosphite ester groups of the triphosphite and about one-half of the available phenol groups of the dihydric phenol on a mol for mol basis, may be sufficient.

Also as described in Khattab et al., the salt of a monocarboxylic acid having from about 6 to about 24 carbon atoms and a metal of Group II of the Periodic Table may comprise zinc, calcium, cadmium, barium magnesium, or strontium salts of any organic monocarboxylic acid having from 6 to about 24 carbon atoms which does not contain nitrogen. Suitable acids are also described in U.S. Pat. No. 3,244,650. As therein set forth, the aliphatic aromatic, alicyclic and oxygen-containing heterocyclic organic acids are operable as a class. "Aliphatic acid" includes any open chain carboxylic acid, unsubstituted or substituted with unreactive groups such as halogens, sulfur or hydroxyl. "Alicyclic acid" includes any carboxylic acid having a non-aromatic ring optionally substituted by an unreactive substituent, such as halogens, hydroxyl groups or alkyl and alkynyl radicals or other carbocyclic ring structures. Suitable aromatic acids can be carbocyclic or oxygen-containing heterocyclic and may be substituted by an unreactive ring substituent such as halogens, alkyl or alkenyl radicals and other saturated or aromatic rings condensed therewith.

Organic zinc salts are preferred for use in the stabilizer compositions of the present invention, zinc-2-ethyl hexylate being a specific example of a preferred organic zinc salt.

Also as described in Khattab et al., the ester of alkali salt of thiodipropionic acid has the general formula $R_1OOCCH_2CH_2-S-CH_2CH_2COOR_2$ werein $R_1$ and $R_2$, which may be the same or different, are independently selected from the group consisting of hydrogen, alkali metals, straight chain or branched chain alkyl radicals having from 1 to 36 carbon atoms, cycloalkyl radicals having from 3 to 36 carbon atoms, alkenyl radicals having from 6 to 36 carbon atoms, aryl radicals and alkaryl radicals, with the proviso that not more than one of $R_1$ and $R_2$ may be hydrogen. The alkyl, cycloalkyl, alkenyl, aryl and alkaryl radicals may be unsubstituted or may, if desired, contain unreactive inert substituents such as halogens.

Exemplary suitable alkali metal salts and esters of thiodipropionic acid include mono- and disodium thiodipropionate, mono- and dipotassium thiodipropionate, mixed sodium-potassium thiodipropionate, monolauryl thiodipropionate, dilauryl thiodipropionate, distearyl thiodipropionate, butyl stearyl thiodipropionate, 2-ethylhexyl lauryl thiodipropionate, di-2-ethylhexyl thiodipropionate, diisodecyl thiodipropionate, isodecyl phenyl thiodipropionate, benzyl lauryl thiodipropionate, benzyl phenyl thiodipropionate, the esters of fatty alcohols obtained from tallow, cotton seed oil or soya-bean oil and thiodipropionic acid. These esters as a class are known compounds. Many are commercially available. All can be prepared by methods known to those skilled in the art involving esterifications of thiodipropionic acid with the corresponding alcohol.

Especially preferred for use in the composition of the present invention are disodium thiodipropionate, distearyl thiodipropionate, and dilauryl thiodipropionate.

As thiodipropionic acid esters or alkali metal salts useful in conjunction with tetrakis[methylene 3-(3',5'-di-t-butyl-4'-hydroxyphenyl)propionate]methane or other anti-oxidants there may be employed any of the compounds described above as useful in the three-component mixture.

As acid scavengers there may be employed in this invention an oxide of a metal of Group II of the Periodic Table. Examples of such oxides include calcium oxide, strontium oxide, barium oxide, magnesium oxide, zinc oxide and cadmium oxide. The preferred acid scavenger is calcium oxide. As previously indicated, the acid scavenger prevents odor emission and bubble formation when the copolymer compositions are subjected to irradiation for cross-linking.

The additives employed in this invention may be admixed with the copolymer using conventional mechanical procedures. The individual additives can be added separately or be mixed prior to addition and they may be added in solution or be dry blended with the copolymer. Liquid or soluble additives or components thereof can be admixed with polar organic solvents containing no hydroxyl groups, such as ketones and ethers, as well as with non-polar aliphatic or aromatic solvents, such as hexane, heptane or toluene, and be sprayed onto the polymmer if in finely divided form in conventional tumbling or blending devices. For molding operations, such as extrusion or injection molding, the blended mixture may be passed through an extruder and the extruded rod chopped into pellets of desired size. Alternatively, the additives may be admixed with the copolymer by tumbling pellets of the copolymer, adding liquid additives, tumbling again to distribute the liquid additives, then adding the dry additives, continuing tumbling to distribute the dry components evenly over the surface of the pellets, and then extruding the resultant mixture to intimately blend the copolymer and additives.

The following examples depict preferred embodiments of this invention.

EXAMPLE 1

Dry powdered ethylene/chlorotrifluoroethylene copolymer of about 40 mesh particle size containing about 50% of ethylene units, having a melting point of 245°C. and a melt index of about 1.0, is mixed with various additives in a ball mill for 1 hour. The various copolymer blends are charged into a melt rheometer, as described in ASTM D-1238, which is maintained at 270°C., and are placed under a load of 2160 grams and extruded through a 0.0825 inch diameter orifice. Dwell time in the rheometer and melt flow are measured and the extrudate appearance is rated. The results are summarized in Table 1, all percentages of the additives being by weight based upon the weight of the copolymer.

As is apparent from Table 1, the copolymer blends of this invention (Samples 3-6) evidence an increase in viscosity of about 5 to 9% after 10 minutes at 270°C. and retain adequate fluidity for processing after 30 minutes at 270°C., producing a bubble-free yellow extrudate. In comparison, comparative Samples 1 and 2, which do not include the anti-oxidant of this invention, evidence a viscosity increase of 55 to 60% after 10 minutes at 270°C. and become non-flowing after 30 minutes at that temperature, producing a discolored (dark yellow), bubbled extrudate.

TABLE 1

| SAMPLE | ADDITIVES | DWELL TIME at 270°C., MIN | MELT FLOW, G/L MIN | EXTRUDATE APPEARANCE |
|---|---|---|---|---|
| 1* | 1% triallylisocyanurate plus 0.5% CaO | 5<br>10<br>30<br>60 | 5.7<br>2.5<br><0.1<br><0.1 | 1<br>3<br>4<br>4 |
| 2* | 1% triallylcyanurate plus 0.5% CaO | 5<br>10<br>30<br>60 | 6.2<br>2.5<br><0.1<br><0.1 | 1<br>3<br>4<br>4 |
| 3 | 1% triallylisocyanurate plus .225% phosphite of 4,4-n-butylidene-bis-(6-tert-butyl-m-cresol) plus .075% zinc-2-ethylhexylate plus 0.15% distearylthiodipropionate plus 0.5% CaO | 5<br>10<br>30<br>60 | 8.4<br>7.0<br>1.9<br><0.1 | 1<br>1<br>2<br>3 |
| 4 | 1% triallylcyanurate plus .225% phosphite of 4,4-n-butylidene-bis-(6-tert.-butyl-m-cresol) plus 0.75% zinc-2-ethylhexylate plus 0.15% distearylthiodipropionate + 0.5% CaO | 5<br>10<br>30<br>60 | 8.1<br>7.7<br>2.1<br><0.1 | 1<br>2<br>3<br>3 |
| 5 | 1% triallylisocyanate plus 0.3% tetrakis[methylene 3-(3',5'-di-t-butyl-4'-hydroxyphenyl)propionate] methane plus 0.15% distearylthiodipropionate plus 0.5% CaO | 5<br>10<br>30<br>60 | 9.3<br>8.8<br>1.9<br><0.1 | 1<br>3<br>3<br>4 |
| 6 | 1% triallylcyanurate plus 0.3% tetrakis-[methylene 3-(3',5'-di-t-butyl-4'-hydroxyphenyl)propionate] methane plus 0.5% distearylthiodipropionate plus 0.5% CaO | 5<br>10<br>30<br>60 | 9.1<br>8.3<br>2.4<br><0.1 | 1<br>3<br>3<br>4 |

*Comparative test
**1 = white, no bubbles
 2 = slightly yellow, no bubbles
 3 = yellow, no bubbles
 4 = dark yellow, bubbles

TABLE 2

| SAMPLE | | COBALT-60 DOSAGE, MEGARADS | MELT FLOW, G/L MIN |
|---|---|---|---|
| 3* | | 0<br>5<br>10 | 8.4<br><0.1<br><0.1 |
| 4* | | 0<br>5<br>10 | 8.8<br><0.1<br><0.1 |
| 5* | | 0<br>5<br>10 | 9.1<br><0.1<br><0.1 |
| 6* | | 0<br>5<br>10 | 9.7<br><0.1<br><0.1 |
| 7 | 0.225% phosphite of 4,4-n-butylidene-bis-(6-tert-butyl-m-cresol) plus 0.075% of zinc-2-ethylhexylate plus 0.15% distearylthiodipropionate plus 0.5% CaO** | 0<br>5<br>10 | 11.0<br>6.3<br>2.4 |
| 8 | 0.3% of tetrakis[methylene 3-(3',5'-di-t-butyl-4'-hydroxyphenyl)propionate] plus 0.15% distearylthiodipropionate plus 0.5% CaO** | 0<br>5<br>10 | 9.7<br>4.1<br>1.2 |

*Compositions are those given in Table 1.
**Comparative Sample

EXAMPLE 2

Copolymer blends, including some of the samples of Example 1, are subjected to various amounts of cobalt-60 radiation at a dose rate of 2.5 megarads per hour to cross-link the copolymer. The melt flow rate is measured as in Example 1. Samples 7 and 8 are prepared according to the general procedures of Example 1. The results are given in Table 2, below.

It can be seen that a 5 megarad dosage of cobalt-60 radiation renders the copolymer blends of this invention non-flowing (cross-linked) at 270°C. whereas the control blends exhibit measurable flow even after exposure to 10 megarads of cobalt-60.

EXAMPLE 3

Copolymer compositions of this invention are prepared following the general procedure of Example 1 and are compression molded into 0.060 inch sheets. The sheets are subjected to cobalt-60 radiation and electron beam radiation and various mechanical properties are measured. The results are summarized in Table 3.

TABLE 3

| Sample | Temp. °C. | Dosage Radiation (Megarads) | | Yield Stress (psi) | Break Stress (psi) | Yield Elongation % | Break Elongation % | Tensile Modulus (psi) $10^5$ | Work to Break (psi) $10^3$ | Thermal Stress Cracking* |
|---|---|---|---|---|---|---|---|---|---|---|
| 9 | 23 | electron beam | 0 | 4670 | 8100 | 4.5 | 225 | 2.0 | 10,971 | |
| | | | 2 | 4680 | 8050 | 4.6 | 220 | 2.0 | 10,833 | |
| | | | 5 | 4580 | 7710 | 4.1 | 210 | 2.0 | 10,305 | |
| | | | 10 | 4540 | 7520 | 4.9 | 215 | 1.9 | 9,395 | |
| | | | 25 | 5440 | 8110 | 4.3 | 175 | 2.3 | 7,104 | |
| | 200 | | 0 | 265 | 217 | 12 | 24 | 2.8 | 33 | |
| | | | 2 | 293 | 235 | 33 | 145 | 2.3 | 307 | |
| | | | 5 | 335 | 435 | 30 | 430 | 3.5 | 1,173 | |
| | | | 10 | 295 | 575 | 35 | 518 | 2.7 | 1,347 | |
| | | | 25 | 370 | 770 | 36 | 355 | 3.4 | 1,648 | |
| | 23 | cobalt-60 | 0 | 4250 | 7740 | | 234 | 1.77 | | |
| | | | 2 | 4500 | 7670 | | 217 | 1.71 | | |
| | | | 5 | 4650 | 7530 | | 201 | 1.83 | | |
| | | | 15 | 4520 | 6860 | | 171 | 1.73 | | |
| | | | 30 | 4470 | 4590 | | 104 | 2.8 | | |
| | 200 | | 0 | 265 | 217 | | 24 | 3.45 | | yes |
| | | | 2 | 310 | 250 | | 276 | 3.5 | | no |
| | | | 5 | 316 | 626 | | 488 | 3.68 | | no |
| | | | 15 | 323 | 708 | | 410 | 3.75 | | no |
| | | | 30 | 310 | 580 | | 390 | 3.61 | | |
| 10 | 200 | cobalt-60 | 0 | 177 | 244 | | 17 | | 14 | yes |
| | | | 5 | 179 | 307 | | 25 | | 75 | yes |
| | | | 10 | 266 | 271 | | 230 | | 559 | no |
| | | electron beam | 0 | 177 | 244 | | 17 | | 14 | |
| | | | 5 | — | 135 | | 9 | | 39 | |
| | | | 10 | 225 | 115 | | 36 | | 75 | |
| | | | 25 | 250 | 390 | | 565 | | 1,457 | |
| 11 | 200 | cobalt-60 | 0 | 265 | 217 | | 33 | | | yes |
| | | | 2 | 310 | 250 | | 721 | | | no |
| | | | 5 | 316 | 626 | | 2010 | | | no |
| | | | 15 | 323 | 708 | | 1567 | | | no |
| | | electron beam | 0 | 265 | 217 | | 33 | | | |
| | | | 2 | 293 | 235 | | 307 | | | |
| | | | 5 | 335 | 435 | | 1173 | | | |
| | | | 10 | 295 | 575 | | 1347 | | | |
| | | | 25 | 370 | 770 | | 1648 | | | |

Sample 9 - 0.225% of phosphite of 4,4-n-butylidene-bis-(6-tert.-butyl-m-cresol) plus 0.075% of zinc-2-ethylhexylate plus 0.15% distearylthiodipropionate plus 0.5% of CaO plus 0.25% triallylisocyanurate Sample 10 - 0.225% of phosphite of 4,4-n-butylidene-bis(6-tert.-butyl-m-cresol) plus 0.15% distearylthiodipropionate plus 0.25% CaO plus 0.25% triallylisocyanurate Sample 11 - 0.225% phosphite of 4,4-n-butylidene-bis(6-tert.-butyl-m-cresol) plus 0.15% distearylthiodipropionate plus 1.0% CaO plus 1.0% triallylisocyanurate

*Mandrel wrap test MIL - P - 390C, Part H

It is to be understood that variations and modifications of the present invention may be made without departing from the scope of the invention. It is to be understood that the scope of the invention is not to be interpreted as limited to the specific embodiment disclosed herein, but only in accordance with the appended claims when read in light of the foregoing disclosure.

We claim:

1. A copolymer composition which comprises an admixture of an ethylene/chlorotrifluoroethylene copolymer and by weight of the copolymer, (a) about 0.1 to 5 % of a radiation cross-linking promoter selected from the group consisting of triallylisocyanurate, triallylcyanurate, triallylphosphite, diallylfumarate, diallylisophthalate and diallylterephthalate, (b) about 0.01 tp 5 % of an anti-oxidant selected from the group consisting of (1) mixtures of a phosphite or an organic polyhydric phenol and a salt of a carboxylic acid and a metal of Group II of the Periodic Table, (2) alkylated phenols and bisphenols having 1 to 18 carbon atoms in the alkyl chain, (3) alkylidene bis, tris and polyphenols having 1 to 8 carbon atoms in the alkylidene chain, and (4) mixtures of (1), (2) or (3) with an ester or alkali metal salt of thiodipropionic acid and (c) about 0.1 to 30 percent of an acid scavenger comprising an oxide of a metal of Group II of the Periodic Table.

2. The composition of claim 1 wherein said copolymer contains about 40 to about 60 mol % of ethylene units and correspondingly about 60 to 40 mol % of chlorotrifluoroethylene units.

3. The composition of claim 2 wherein said anti-oxidant comprises a mixture of (a) about 0.01 to 5 % by weight of the copolymer of a transesterified reaction product of an organic polyhydric phenol having from 6 to about 50 carbon atoms and an organic phosphite triester free from phenolic hydroxyl groups having up to 60 carbon atoms obtained by transesterification of the phenol and phosphite, about 0.01 to 5 % by weight of the copolymer of a salt of a monocarboxylic acid having from 1 to about 24 carbon atoms and a metal of Group II of the Periodic Table, and about 0.01 to 5 % by weight of the copolymer of an ester or alkali metal salt of thiodipropionic acid.

4. The composition of claim 3 wherein the transesterified reaction product is obtained from an organic polyhydric phenol selected from the group consisting of 1,1,3-tris(2-methyl-4-hydroxy-5-tert.-butyl phenol)-butane and a phenol of the formula

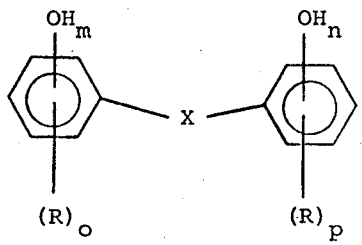

wherein X is selected from the group consisting of oxygen, sulfur, alkylene, alicyclidene, arylidene and mixed alkylene-arylidene and alkylene-alicyclidene groups, wherein the aliphatic or cycloaliphatic portion of the molecule may be straight chain or branched chain, having from 1 to about 18 carbon atoms; wherein the R substituents are independently selected from the group consisting of hydrogen and alkyl, straight or branched chain, having from 1 to about 18 carbon atoms; and wherein $m$ and $n$ are integers from 1 to 5, and $o$ and $p$ are integers from 0 to 4, with the proviso that the sume of $m + o$, and $n + p$ may not exceed 5.

5. The composition of claim 4 wherein the transesterified reaction product is obtained from an organic phosphite having the formula $(Ra)_3P$ wherein a is selected from the group consisting of oxygen, sulfur and mixtures thereof, and R is selected from the group consisting of aryl, alkyl, cycloalkyl, aralkyl and alkaryl.

6. The composition of claim 1 wherein said acid scavenger is selected from the group consisting of calcium oxide, strontium oxide, barium oxide, magnesium oxide, zinc oxide and cadmium oxide.

7. The composition of claim 1 wherein said cross-linking agent is triallylisocyanurate.

8. The composition of claim 7 wherein said anti-oxidant comprises a mixture of 4,4'-n-butylidene-bis(6-tert.-butyl-m-cresol), zinc-2-ethylhexylate and distearyl thiodipropionate, and said acid scavenger is calcium oxide.

9. The composition of claim 8 wherein the copolymer is an about equimolar ethylene/chorotrifluoroethylene copolymer.

10. The composition of claim 9 comprising about 0.75 to 1.5% of said radiation cross-linking promoter, about 0.1 to 0.5% of said anti-oxidant and about 0.25 to 10% of said acid scavenger.

11. A copolymer composition in accordance with claim 1 wherein said cross-linking promoter is triallylcyanurate.

12. A copolymer composition in accordance with claim 1 wherein said cross-linking agent is triallylphosphite.

13. A copolymer composition in accordance with claim 1 wherein said cross-linking agent is diallyfumarate.

14. A copolymer composition in accordance with claim 1 wherein said cross-linking agent is diallylisophthalate.

15. A copolymer composition in accordance with claim 1 wherein said cross-linking agent is diallylterephthalate.

* * * * *

UNITED STATES PATENT AND TRADEMARK OFFICE
CERTIFICATE OF CORRECTION

PATENT NO. : 3,947,525
DATED : March 30, 1976
INVENTOR(S) : Arthur B. Robertson and Robert J. Schaffhauser It is certified that error appears in the above-identified patent and that said Letters Patent are hereby corrected as shown below:

Col. 2, line 6, "whih" should be --which--

Col. 2, line 31, "200°" should be --220°--

Col. 2, line 32, "described" should be --prepared--

Col. 3, line 37 "butyphenol" should be --butylphenol--

Col. 5, line 36 "werein" should be --wherein--

Col. 6, line 26 "polymmer" should be --polymer--

Col. 9, line 46 after "It is" insert --also--

Col. 9, line 60 "tp" should be --to--

Col. 9, line 61 "or" should be --of--

Signed and Sealed this twenty-second Day of June 1976

[SEAL]

Attest:

RUTH C. MASON
Attesting Officer

C. MARSHALL DANN
Commissioner of Patents and Trademarks